United States Patent [19]

Hayes

[11] Patent Number: 5,323,223
[45] Date of Patent: Jun. 21, 1994

[54] RADAR LASER TRANSMITTER

[75] Inventor: Cecil L. Hayes, Placentia, Calif.

[73] Assignee: Rockwell International Corporation, Seal Beach, Calif.

[21] Appl. No.: 85,499

[22] Filed: Aug. 14, 1987

[51] Int. Cl.$^5$ ............................................... G01C 3/08
[52] U.S. Cl. .......................................................... 356/5
[58] Field of Search ............................ 356/5; 342/129

[56] References Cited

U.S. PATENT DOCUMENTS

| | | | |
|---|---|---|---|
| 3,082,418 | 3/1963 | Milosevic | 342/129 |
| 3,437,820 | 4/1969 | Thompson Jr, et al. | 356/5 |
| 3,522,992 | 8/1970 | Jaffe | 356/5 |
| 3,542,472 | 11/1970 | Smith-Vaniz | 356/5 |
| 3,625,619 | 12/1971 | Scholdstrom | 356/5 |
| 3,750,172 | 7/1973 | Tresselt | 342/129 |
| 3,778,159 | 12/1973 | Hines et al. | 356/5 |
| 4,005,936 | 2/1977 | Redman et al. | 356/5 |
| 4,163,954 | 8/1979 | Hayes | 356/5 |
| 4,190,361 | 2/1980 | Dubrunfaut | 356/5 |
| 4,537,502 | 8/1985 | Miller et al. | 356/5 |

Primary Examiner—Mark Hellner
Attorney, Agent, or Firm—H. Fredrick Hamann; George A. Montanye; Tom Streeter

[57] ABSTRACT

A laser radar for scanning a target aperture having a predetermined array of locations comprising a laser means having a power source and a resonator cavity containing a lasing medium, the laser means providing a SINGLE FREQUENCY LIGHT SOURCE (FO); means for dividing the SINGLE FREQUENCY LIGHT SOURCE into FIRST and SECOND REFERENCE FREQUENCY BEAMS; frequency shifting means for frequency shifting the FIRST REFERENCE FREQUENCY BEAM to form a FREQUENCY SHIFTED BEAM; control means for providing APERTURE DIRECTION SIGNALS; scanner means responsive to the APERTURE DIRECTION SIGNALS for combining and directing the FIRST REFERENCE FREQUENCY BEAM and the FREQUENCY SHIFTED BEAM to each predetermined target aperture location and for receiving a combined REFLECTED REFERENCE FREQUENCY BEAM SIGNAL and a REFLECTED FREQUENCY SHIFTED BEAM SIGNAL from the target; detector means for combining and detecting a sample of the SECOND REFERENCE FREQUENCY BEAMS in combination with the REFLECTED REFERENCE FREQUENCY BEAM SIGNAL and the REFLECTED FREQUENCY SHIFTED BEAM SIGNAL to provide a RANGE CARRIER SIGNAL; monitor means for combining and detecting a sample of the SINGLE FREQUENCY LIGHT SOURCE, and a sample of the FREQUENCY SHIFTED BEAM to form a DEMODULATION REFERENCE SIGNAL; phase demodulation means referenced to the DEMODULATION REFERENCE SIGNAL and responsive to the RANGE CARRIER SIGNAL for demodulating the RANGE CARRIER SIGNAL to provide a RELATIVE AND ABSOLUTE RANGE SIGNAL; and signal processor and display means responsive to the RELATIVE AND ABSOLUTE RANGE SIGNAL and to the APERTURE DIRECTION SIGNALS for quantizing and storing the digital the digital value of the amplitude of the corresponding relative phase delay between the RELATIVE RANGE SIGNAL and the DEMODULATION REFERENCE SIGNAL for each respective location in the target aperture.

11 Claims, 8 Drawing Sheets

RADAR LASER TRANSMITTER

BACKGROUND OF THE INVENTION

1. Field of the Invention

This invention relates to the field of Radar and more particularly to the field of radar transmitters and receivers.

2. Description of Prior Art

Laser transmitters for use in radar applications are known. The inventor, while working for the assignee, collaborated in the development and delivery of a related laser transmitter for a radar application that employed two separate laser sources. These laser sources were frequency-locked at different frequencies by a frequency modulation servo. The present laser invention RADAR LASER TRANSMITTER eliminates the need for the second laser source and the frequency locking-servo.

The invention transmitter uses a multiple frequency processing technique for the purpose of extracting information from the received signal. Some subject matter related to this technique for processing multiple frequency signals appears in a text titled *Introduction to Radar Systems* by author M. I. Skolnik; published by McGRAW HILL, 1962.

SUMMARY OF THE INVENTION

This invention characterizes an improved radar transmitter for use in imaging a target scene while moving to or from the scene. This invention laser radar uses a single laser. The single laser source employed should be reasonably stable, but need not be frequency stabilized by elaborate servo means. The invention transmitter provides a continuous source of laser light having a first and second frequency component, the first and second frequency components being accurately separated by a fixed frequency difference referenced to a fixed frequency reference oscillator.

It is a major objective of this invention to provide a laser source of illumination to a scanner, the laser source having first and second frequency components derived by the use of an acousto-optic modulator.

It is a further objective of this invention to receive reflected light from the target scene, to couple the received light onto a detector for the purpose of producing an electrical signal containing frequency difference information; the frequency difference information providing range, position and speed information.

It is a further objective of this invention to eliminate unwanted doppler shift related signals by using a second mixing stage after the first stage of detection. The second mixer performs a squaring function to sufficiently shift undesired doppler shift signals to a higher frequency. Shifting the spectral location of these signals makes it possible to conveniently remove them by use of a conventional passive band-pass filter.

PREFERRED EMBODIMENT

Figure 1:
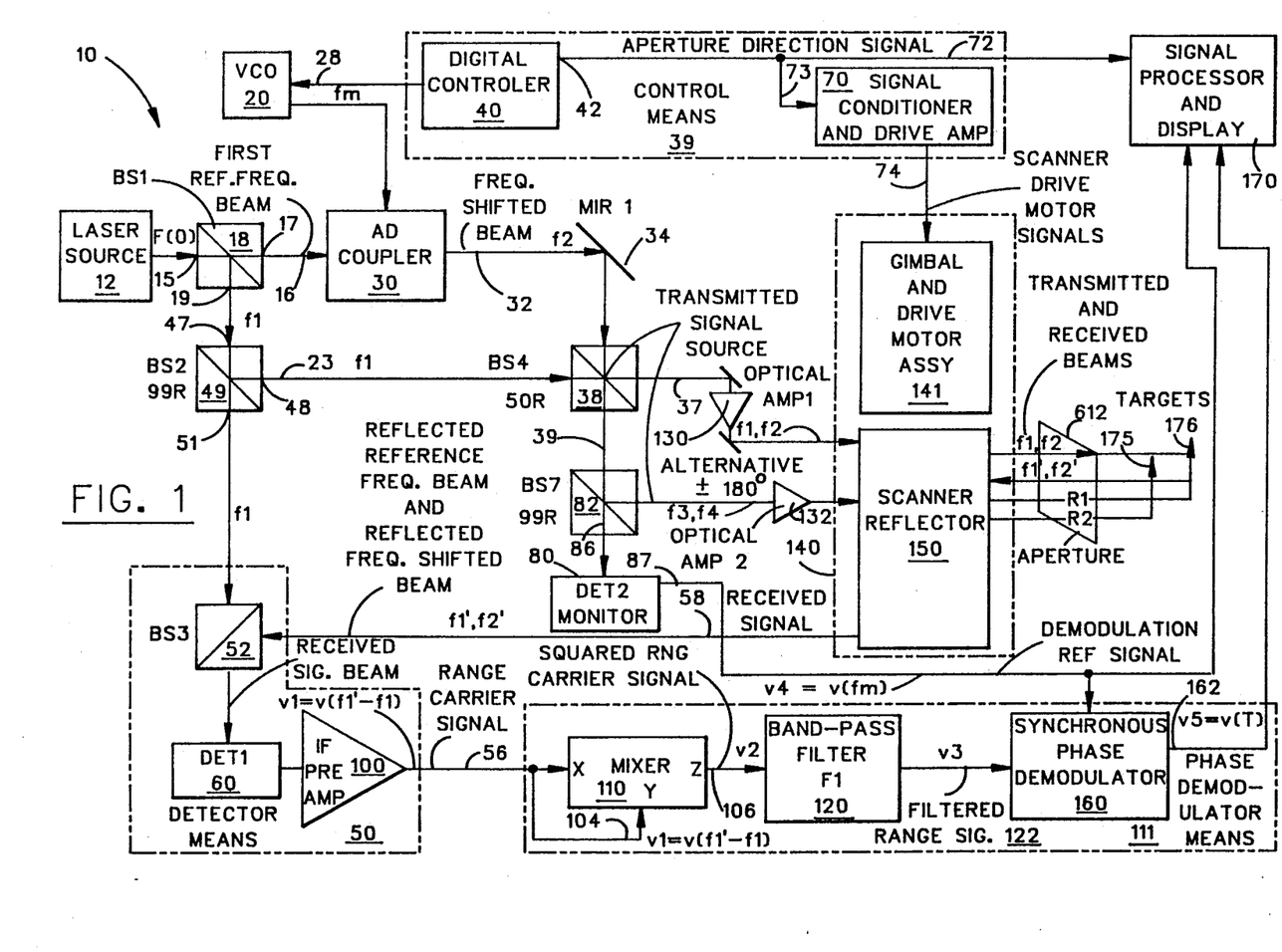
FIG. 1 is a block diagram showing the arrangement or components in the invention radar laser transmitter.
Figure 2:
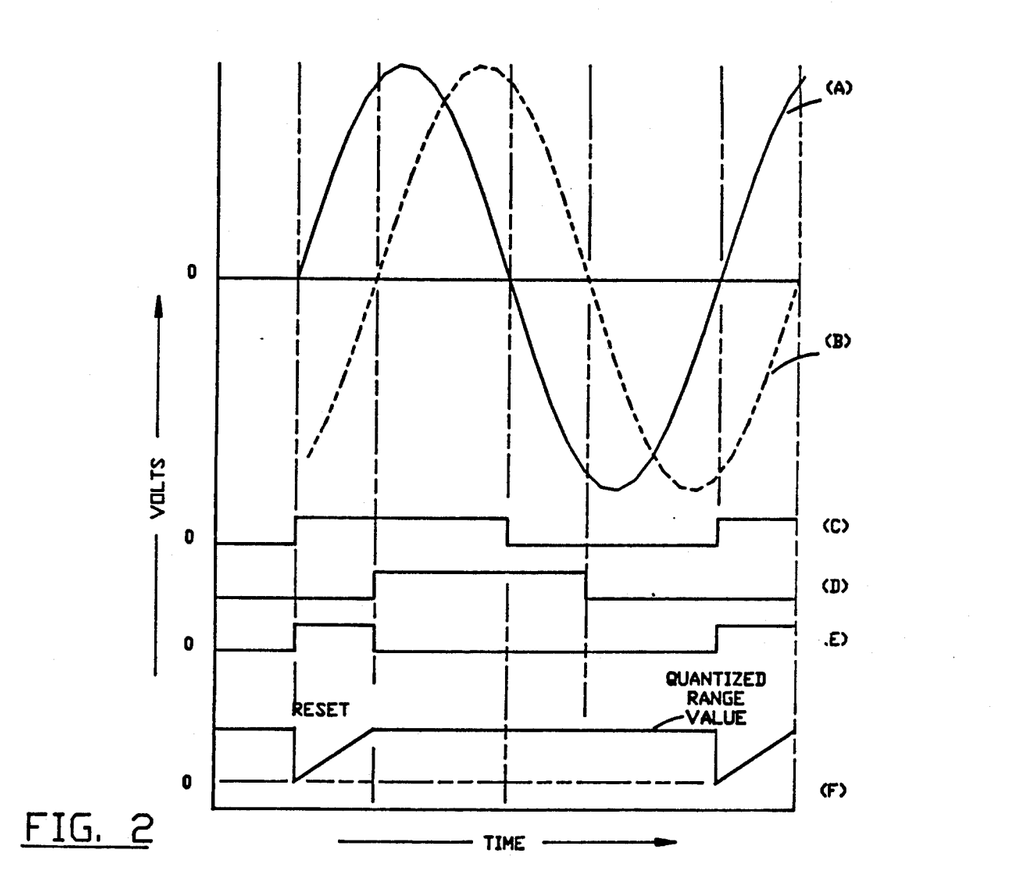
FIG. 2 is a timing diagram for the invention radar laser transmitter and receiver.
Figures 5A, 5C:
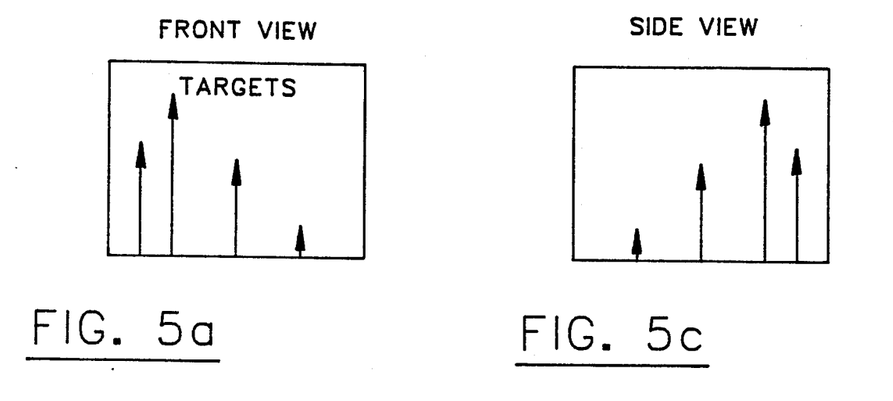
FIGS. 5a-5c are FRONT, TOP and SIDE views of a target scene.
Figure 5B:
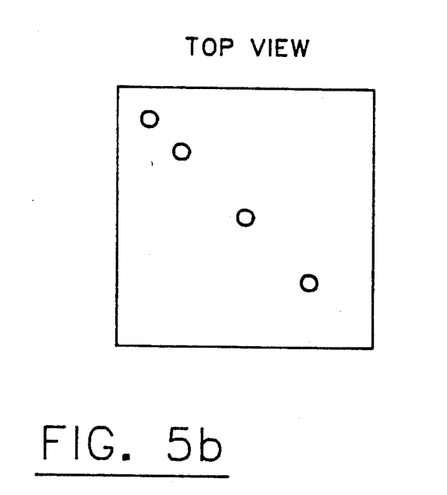
Figure 6:
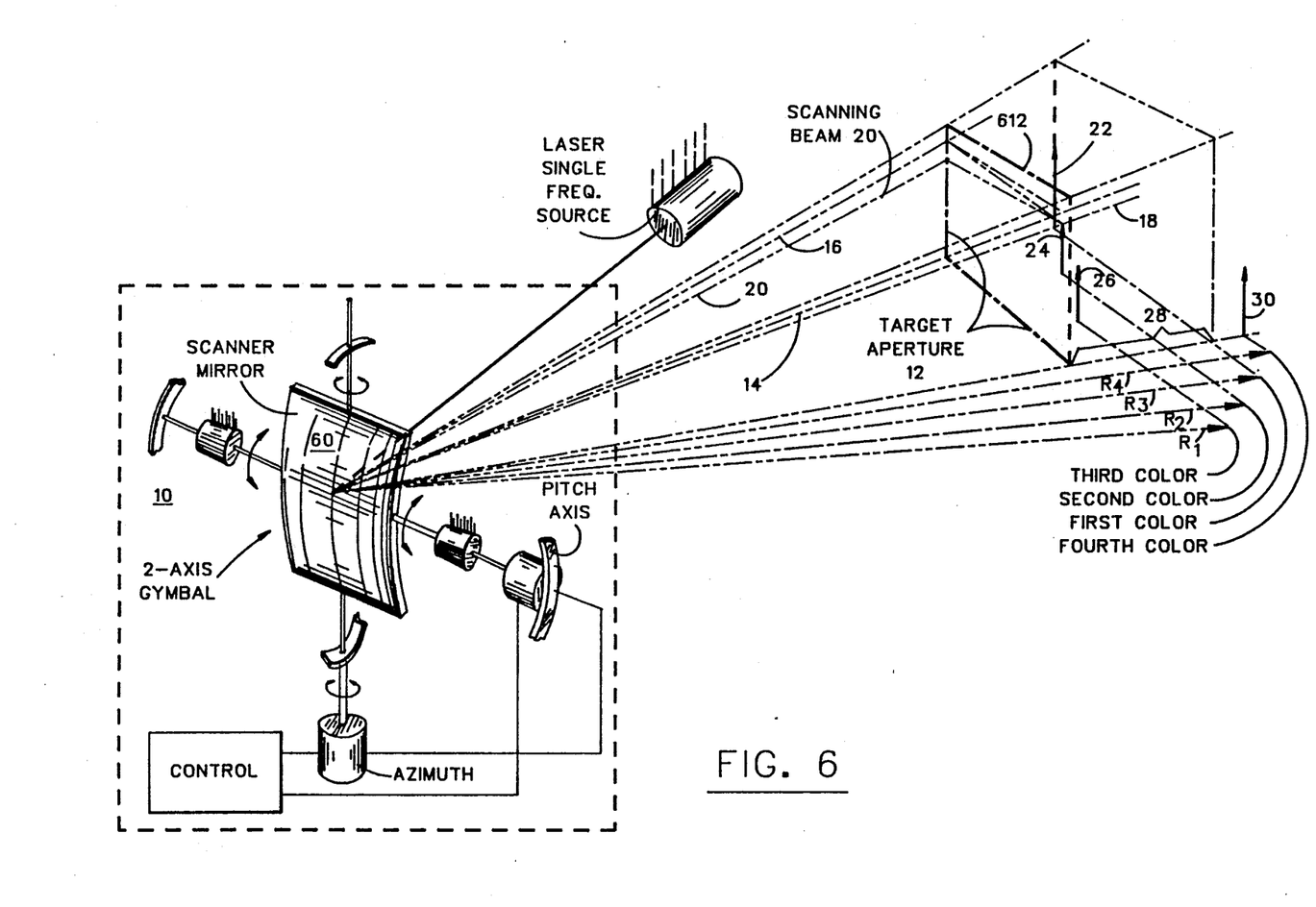
FIG. 6 is a perspective view of the target scene of FIGS. 5a-5c showing the invention laser radar scanning the target aperture pixel locations of FIG. 4.
Figure 7:
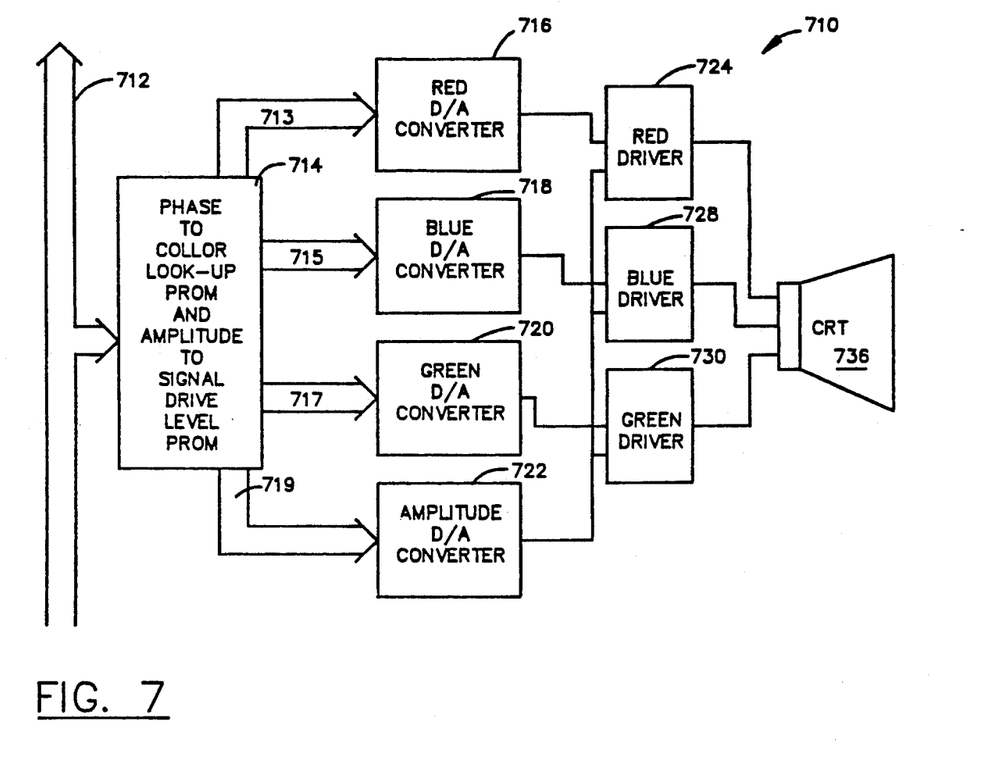
FIG. 7 is a block diagram of a typical video control and signal drive means.

FIG. 1 shows a block diagram of the invention laser radar 10 for scanning a target aperture 172 having a predetermined array of locations while moving to or from the target. FIGS. 5a, 5b, and 5c depict respective front, top, and side views of a target scene in which four targets appear, each target having a different height. FIG. 6 shows a perspective view of the target scene of FIGS. 5a, 5b, and 5c being scanned by the invention laser radar within phantom block 10. FIG. 6 shows the target aperture of FIG. 5a within phantom parallelogram 612. The target aperture is scanned by laser beam 614 in a line-by-line sequence from top to bottom. The beam scans each line from right to left as shown in this particular embodiment. The transmitted beam is a continuous source of light, the light moving from the transmitter within phantom block 10 to the target aperture, and is reflected by respective targets as the beam is moved to encounter a target. A signal is received when the beam strikes a target and reflects light back to the laser radar 10 or when the beam illuminates objects in the background of the target scene.

FIGS. 4a through 4e characterize movement of the transmitted beam across the laser aperture as it moves from left to right from a first to a second, from a second to a third, and from a third to an Nth pixel (picture element) location as the first line or row of pixel locations, designated as row 1, is scanned. The beam is then retraced to the second row of pixel locations in the aperture array and is shown moving from the Nth location in row 1, i.e. the 1N location to the 21 pixel location. The second row is then scanned in turn.

Referring now to FIG. 1, the laser source 12 represents a laser means having a power source and a resonator cavity (not shown) containing a lasing medium, such as $CO_2$ gas. The laser means 12 provides a SINGLE FREQUENCY LIGHT SOURCE (FO). A $CO_2$ laser with an output power of over 2 watts has been used at ranges of up to one kilometer.

Referring to FIG. 1, the SINGLE FREQUENCY LIGHT SOURCE beam FO, 14 reaches beamsplitter BS1, 18 and is divided. BS1 18 is a 50R beamsplitter for dividing the SINGLE FREQUENCY LIGHT SOURCE (FO) beam 14 into a FIRST and SECOND REFERENCE FREQUENCY BEAM 16, 22, respectively. A 50R beamsplitter reflects approximately 50% of the incident energy. Approximately 50% of the energy transmitted by laser source 12 on beam 14 strikes the left side of BS1, 18 and is reflected down as beam 22 having frequency f1. Approximately 50% of the energy from beam 14 passes through BS1 to form beam 16, also having frequency f1. Beamsplitter BS1, 18 represents a first beam splitter having at least a first input port 15 and reflected and transmitting output ports 19 and 17, respectively. The input port 15 of BS1 is positioned to be responsive, i.e. to receive the SINGLE FREQUENCY LIGHT SOURCE (FO). The reflected output port 19 transmits the SECOND REFERENCE FREQUENCY BEAM and output port 17 to provide a FIRST REFERENCE FREQUENCY BEAM 16. The FIRST REFERENCE FREQUENCY BEAM enters a frequency modulator such as AO COUPLER 30.

AO COUPLER 30 represents a frequency shifting means, or frequency modulator responsive to a FREQUENCY DIFFERENCE SIGNAL $f_m$ for frequency shifting the FIRST REFERENCE FREQUENCY BEAM to form a FREQUENCY SHIFTED BEAM f2, 32. An electro-optic modulator could be adapted for equivalent use. The frequency of the FREQUENCY SHIFTED BEAM is typically shifted up in frequency. The AO COUPLER 30 is driven by a sinusoidal oscillator output from VCO 20 at frequency $f_m$, at typically 40 MHz. AO devices such as the MODEL #AGD 756, an ACOUSTIC OPTIC CELL, is available from INTRA ACTION CORP. of BELLWOOD, Ill. 60104, USA. This AO device would typically be driven by a MODEL #DE DEFLECTOR DRIVER (not shown) from the same company.

Phantom block 39 represents a control means for providing APERTURE DIRECTION SIGNALS via signal line 72, 73 and a FREQUENCY DIFFERENCE SIGNAL to VCO 20 via signal line 28. The aperture direction signals are typically digital signals on a data buss characterizing where the transmittal beam is pointing on the target aperture, the aperture via digital coordinates and directing the same location information to the signal processor and display 170 to permit it to store the digitized v5 signal from the phase demodulator means 111.

Elements within phantom block 140 represents a scanner means responsive to SCANNER DRIVE MOTOR SIGNALS via signal path 74 from phantom block 39 for combining and directing the FIRST REFERENCE FREQUENCY BEAM f1 and the FREQUENCY SHIFTED BEAM f2 to each predetermined target aperture location and for receiving a REFLECTED REFERENCE FREQUENCY BEAM SIGNAL f1' and a REFLECTED FREQUENCY SHIFTED BEAM f2' via received beams 174 from the targets 175, 176. In alternative embodiments, the beam can be scanned in an ordered pattern while the encoded position of the beam is constantly fed to the signal conditioner and drive amplifier 70 and/or to the signal processor and display 170 to permit the collected data to be mapped into the memory of the signal processor and display 170.

AMP1, 130 and AMP2, 132 represent light amplifiers for the separate channel amplification of respective frequencies $f_1$, $f_2$, $f_3$, and $f_4$. These amplifiers are optional and provide for balanced output light levels at higher power to obtain greater range capability.

Frequencies f3 and f4 are identical to respective frequencies f1 and f2, but f3 and f4 are 180 degrees out of phase with f1 and f2.

The scanner 140 typically has a scanner reflector means 150 positioned to receive light from the REFERENCE FREQUENCY BEAM f1 and the FREQUENCY SHIFTED BEAM f2 via signal path 84 from BS4, 38. The scanner reflector 150 typically contains a single highly reflective mirror (not shown) for directing the combined beams f1 and f2 through a sequence of lines, as shown in FIG. 6, thereby illuminating a scene, pixel by pixel or location by location as characterized by FIGS. 4(a)–4(e). The singly highly reflector mirror is synchronously driven on two axis of rotation as shown in FIG. 6. Encoders are employed to provide azimuth and pitch pointing data corresponding to the pixel being illuminated and viewed.

In an alternative scanner (not shown), the scanner reflector 150 uses two highly reflective mirrors, each mirror synchronously pivoting on an orthogonal axis of rotation.

Scanner 140 typically has a GIMBLE AND DRIVE MOTOR ASSEMBLY represented by block 141 that supports and provides drive torque to the scanner reflector 150 in response to SCANNER DRIVE MOTOR SIGNALS via signal line 74. A separate motor typically drives each axis. The motor drive for moving the reflector in alternate directions is electrically reversed by limit switches. In an alternative embodiment, reversing clutches are used in conjunction with a gear box as in conventional antenna drive systems for radar sets.

The scanner 140 combines and directs the FIRST REFERENCE FREQUENCY BEAM f1 and the FREQUENCY SHIFTED BEAM f2 to each target aperture location as shown by FIGS. 4(a)–4(e).

The predetermined target aperture locations of FIGS. 4(a)–4(e) are characterized as points or locations in a scanned array of aperture locations through which the combined beams pass to reach the target scene. Each of the locations has a corresponding pair of data locations or storage registers in the functional block described as signal processor and display 170 shown in FIG. 1.

FIG. 5 depicts a typical arrangement of four targets and FIG. 6 depicts the four targets of FIG. 5 being scanned by a beam from the invention laser transmitter receiver 10. FIG. 6 shows the targets to reside at differing range locations R1, R2, R3 and R4, each target producing a different quantized range value.

As shown in FIG. 6, as the combined beam is scanned or directed to successive predetermined aperture locations, the scanner 140 also receives a combined REFLECTED REFERENCE FREQUENCY BEAM SIGNAL f1' and a REFLECTED FREQUENCY SHIFTED BEAM SIGNAL f2' from the target. FIG. 1 shows beam f1' and f2' being received at reflector 150, in scanner.

The phrase "predetermined aperture locations" is not intended to convey the limiting notion of predetermined holes or spaces in a mechanical mask. The term is rather intended to convey the notion of scanning an image scene, line by line, each line having a predetermined number of dedicated locations or viewing regions or spaces through which the scanner points the combined beam. The number of locations specified in the design of a laser radar determines the amount of memory required and the bandwidth of the system.

Phantom block 39 at the top edge of FIG. 1 represents a control means for providing predetermined aperture location direction control signals via signal path 73, 74. In the embodiment depicted, the control means has digital controller 40 for providing a recurring sequence of digitized predetermined aperture location direction control signals from output port 42 to a signal conditioner and drive signal amplifier represented by block 70. The signal conditioner and drive signal amplifier 70 receives the digitized aperture direction control signals from the digital controller and conditions these signals as required to output the scanner drive motor signals on signal line 74 to gimbal and drive motor assembly 141. In a first embodiment, the gimbal and drive motor assembly is a digital servo capable of pointing the combined beam through any aperture pixel location that the signal from the signal conditioner and drive amp designates. The control means 39 also provides predetermined aperture direction control signals via signal path 72 to a signal processor and display means represented by block 170.

Phantom block 50 represents a detector means responsive to a sample of the REFERENCE FREQUENCY BEAM f1 from BS2 output port 51 in combination with the REFLECTED REFERENCE FREQUENCY BEAM SIGNAL f1' and the REFLECTED FREQUENCY SHIFTED BEAM SIGNAL f2' to provide a filtered range carrier signal on signal line 56. Detector means 50 is a detecting means for combining, mixing and amplifying a sample of the SECOND REFERENCE FREQUENCY BEAM f1 via beam 25 in combination with the REFLECTED REFERENCE FREQUENCY BEAM SIGNAL f1' and the REFLECTED FREQUENCY SHIFTED BEAM SIGNAL f2' via beam 58 to obtain a RANGE CARRIER SIGNAL via path 56.

The elements within block 80 represent a monitor means for combining and detecting a sample of the SECOND REFERENCE FREQUENCY BEAM f1 via beam paths 22, 23, and 39 and a sample of the FREQUENCY SHIFTED BEAM via beam paths 32 and 39 to form a DEMODULATION reference signal, v4 on signal line 87 out of the DET2 MONITOR 80. In an alternative embodiment, the FIRST REFERENCE FREQUENCY BEAM is used in place of the SECOND REFERENCE FREQUENCY BEAM since both of these beams have frequency F0, each of which represents a REFERENCE FREQUENCY BEAM.

Elements within phantom block 111 represent a phase demodulator means referenced to the DEMODULATION REFERENCE SIGNAL (v4) via signal line 87 and responsive to the FILTERED RANGE CARRIER SIGNAL v1 via signal line 56 for demodulating the RANGE CARRIER SIGNAL to provide a RELATIVE RANGE SIGNAL v5 on signal line 162.

Block 110 represents a mixer means responsive to the RANGE CARRIER SIGNAL on signal line 56 for squaring the RANGE CARRIER SIGNAL to provide a SQUARED RANGE CARRIER SIGNAL v2 on signal line 106.

The mixer means 110 has a multiplier having a first and second input, X and Y, and an output Z. The first and second inputs are each responsive to the RANGE CARRIER SIGNAL via signal line 104. The output Z provides the SQUARED RANGE CARRIER SIGNAL as signal voltage v2 on signal line 106.

Block 120 of FIG. 1, titled BAND PASS FILTER represents a filter means responsive to the SQUARED RANGE CARRIER SIGNAL v2 for filtering the SQUARED RANGE CARRIER SIGNAL within a predetermined band-pass to provide a FILTERED RANGE SIGNAL v3 on signal line 122. The break points of the band-pass filter 120 limits the bandwidth of the system, and is related to the number of pixels to be imaged.

Block 160 represents a synchronous phase demodulator responsive to said FILTERED RANGE SIGNAL v3 and to the DEMODULATOR REFERENCE SIGNAL v4 for providing the RELATIVE RANGE SIGNAL v5 on signal line 162.

Block 170 represents a signal processing means responsive to the RELATIVE RANGE SIGNAL v5 via signal line 162 for quantizing and storing the value of the amplitude of the corresponding RELATIVE RANGE SIGNAL and for quantizing and storing the value of the corresponding relative phase delay between the RELATIVE RANGE SIGNAL (v5) and the DEMODULATION REFERENCE SIGNAL (v4) for each respective location or pixel in the target aperture. In a more particular embodiment, the signal processor and display means 170 samples the stored pairs of corresponding values for amplitude and phase delay for each respective location in the target aperture and displays a composite color video signal for each predetermined location in the target aperture. Clustered targets having different ranges from the invention laser radar, when imaged by the composite color video signal, are each imaged with a color shift, the color shift being selected, in response to the phase shift, to indicate an increase or decrease in distance.

The invention system is capable of measuring the range to a target while the target range is changing with a relative velocity by measuring the time or phase angle between a DEMODULATION REFERENCE SIGNAL v4 zero crossing and the RELATIVE RANGE SIGNAL v5 zero crossing. Recall that the DEMODULATION REFERENCE SIGNAL v4 has a frequency fm. As the range of a target is increased, the time required for transmitted light to reach the target and return increases. Light has an approximate velocity:

$$C = 3*10^{+8} m/s,$$

where the symbol "*" signifies multiplication and the symbol "/" signifies division. The frequency of the DEMODULATION REFERENCE SIGNAL is "fm" and is dimensioned in cycles per second. The period for one cycle or $2\pi$ radians of the RELATIVE RANGE SIGNAL at frequency fm is:

$$T = 1/fm$$

As the time required for light to travel from the SINGLE FREQUENCY LIGHT SOURCE to the target and return to the receiver begins to exceed the time for completion of one cycle of the DEMODULATION REFERENCE SIGNAL, the system loses the ability to establish the absolute range of the target without periodic shifting of the frequency of fm to bring the time required for signal transit and return to be equal or less than the time required for one period of the DEMODULATION REFERENCE FREQUENCY v4 at frequency fm.

The maximum range through which light can move to a target and return without exceeding the period of the DEMODULATION REFERENCE FREQUENCY v4 is referred to as the ambiguity range R of the system and is given by the equation:

$$R = C/(2*fm).$$

For example, if $fm = 20 \times 10^{+6}$ Hz, $R = 7.5$ meters and if $fm = 100 \times 10^{+3}$ Hz, $R = 1.5 \times 10^3$ meters.

Referring again to FIG. 1, transmitted light is shown leaving the scanner at frequencies f1 and f2, passing through a predetermined location in target aperture 612 to reach target 175 or 176. Reflected energy is returned at frequencies f1', f2'. These frequencies may be equal to f1, or they may differ as a result of doppler shift due to the rate of change of distance between the transmitter and the receiver.

SIGNAL PROCESSING DESCRIPTION

Figure 3:
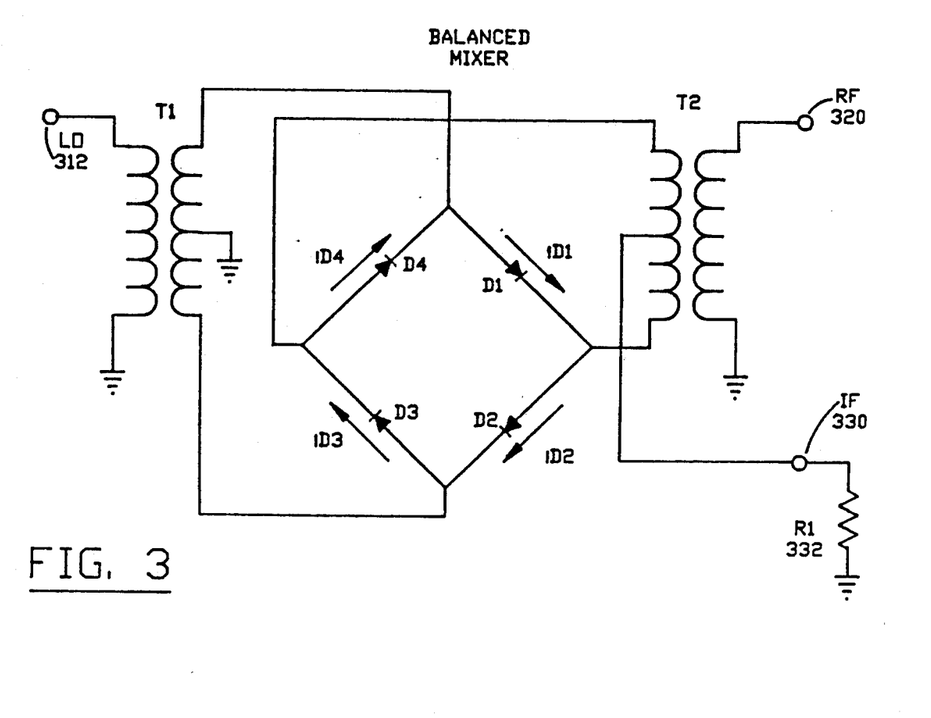
FIG. 3 is a schematic representation of a typical balanced mixer.
Figure 4A:
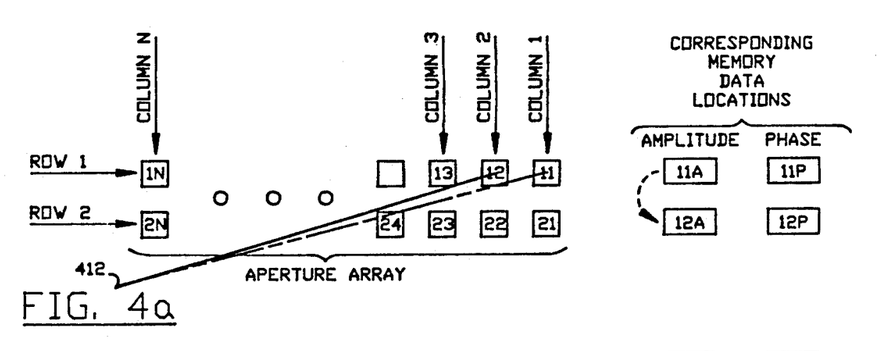
FIGS. 4a-4e are a sequence of figures schematically depicting a sequence (of) figures showing the relationship target aperture array pixel (i.e., picture element) locations and corresponding data locations within a memory subsystem for receiving signal amplitude and signal phase values.
Figure 4B:
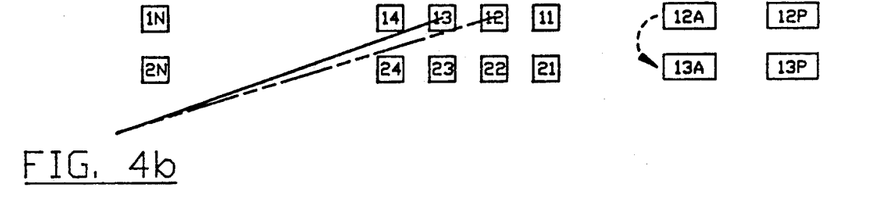
Figure 4C:
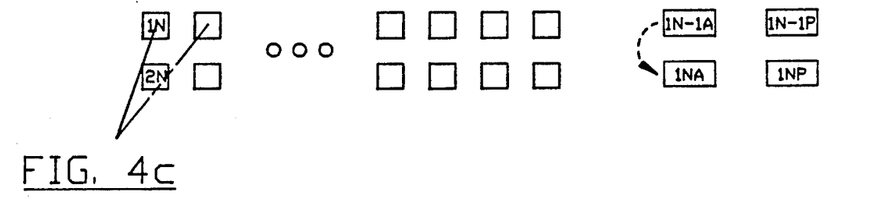
Figure 4D:
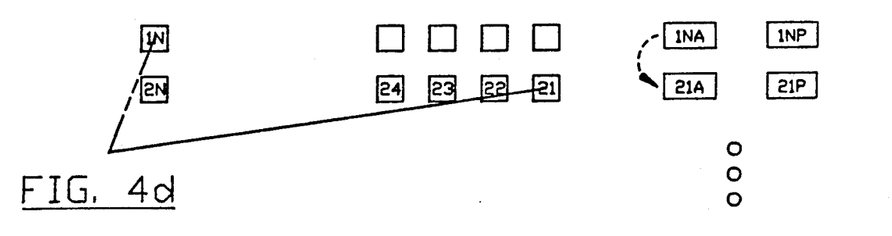
Figure 4E:
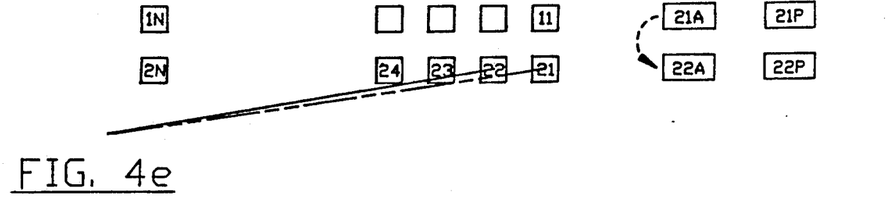

A principal objective of the present invention is to obtain a received signal capable of providing range information but free of the necessity for complex signal processing made necessary by doppler effects due to relative motion between the invention laser transmitter and the target. The transmitter or the targets of interest or both can be moving and if motion is present, doppler shift in the return signals will unreasonably complicate the process of extracting range information from return signal. The purpose of the following analysis is to provide an analytical explanation for the use of the second square law element, i.e. mixer 110, and the simplification in processing that its use suggests. Although FIG. 1 shows the use of a Motorola 1596 multiplier, a passive mixer such as the passive balanced mixer of FIG. 3 could also be used. The first mixing is achieved in DETECTOR 1, 60.

A laser transmitting source having a first and second frequency beam is assumed as shown in FIG. 1. The first and second frequency beams have frequencies f1 and f2 and are separated by a fixed frequency difference or offset frequency Df by AO 30. The received signals f1', f2' and the sample f1 of the SINGLE FREQUENCY F0 are superimposed on detector 1, 60. Detector 1, 60 and MONITOR 80 cannot electrically respond to frequencies f1, f1', f2¹, f2 because these signal frequencies are light frequencies in the range of $10^{+14}$ Hz. Detector 1 will respond electrically to difference frequencies such as f1−f1', f1−f2', and f1'−f2'. Received signals f1' and f2' are subject to a doppler shift in frequency and at transmitter frequencies above $10^{+14}$, the sensitivity to change in frequency is high for small changes in the relative velocity between the receiver and the target. MONITOR 80 is a detector similar or identical to DETECTOR 1. MONITOR 80 is illuminated by a combined sample of light at frequencies f1 and f2.

The system reference for time measurements is provided by the output from MONITOR 80 as:

$$v4 = v(fm) = f1 - f2$$

Referring to the output of DETECTOR 1, with no doppler shift present, f1' and f2' have frequencies identical to f1 and f2, respectively. With no relative motion between the laser radar and the target, there is no doppler shift, the difference signal v1 out of DETECTOR 1, 60, f1'−f2' represents identical frequencies to f1 and f2, each being delayed by the transit time required for the signal to travel to the target and return. The phase difference between v4=f1−f2 and v1=f1'−f2' represents the time required for light to reach the target and return. The signal v1 is a substantially sinusoidal signal with no doppler shift present.

With relative motion between the laser radar and the target present, change in the frequency of v1 with respect to v4 interferes with the systems ability to make relative phase measurements between the two signals necessary to produce range to target signal values.

To illustrate the significance of doppler shift at laser frequencies, consider that a doppler shift of approximately 200 kHz results from a relative velocity difference between the lasers radar and the target of 1 meter/sec. In an alternative application, targets moving at MACH1 with respect to the transmitter can have 60 MHz of doppler shift. Earth orbital velocities increase the doppler frequency shift to approximately 1.5 GHz. The present invention laser radar uses a second MIXER 110 in cooperation with narrow band filtering to eliminate error introduced by doppler frequency shift between the transmitted and received frequencies.

In the absence of relative velocity between the laser radar and the target, a coherent source of light energy would move from the scanner 140 to the target and return with a delay depending on the distance traveled by the light as it moves from the scanner to the target and returns. The time delay is measured by operation of the SYNCHRONOUS DEMODULATOR 160 as a result of the phase difference between the system reference signal v4 and the received signal, the received signal being substantially free of doppler shift.

In practice, laser radar systems have great utility when used to monitor or detect tactical targets where relative motion is unavoidable. The dual frequency system of FIG. 1 evolved as a result of an analysis that proceeds by referring to the dual frequency signals of the system of FIG. 1, assumed to be f1 and f2. The received signal v1 from the target out of detector DET 1 has several additional spectral components which include:

fd = A received signal component having a doppler frequency shift. The doppler shift can vary from zero to an upper limit or maximum doppler shift related to the applications maximum relative velocity.

fm+/−fd = A pair of received signal components having a spectral frequencies above and below fm by a frequency fd. Frequency fm is the frequency difference between the FIRST REFERENCE FREQUENCY BEAM f1 and the FREQUENCY SHIFTED BEAM f2, and fm = f1−f2 is a local oscillator signal component.

It was observed by analysis that by inserting a second mixer stage such as MIXER 110 after DET 1, 60 that the received signal v2 from the target out of MIXER 110 has four significant spectral components which include:

$$fa = 2*fd$$

$$fb = 2*(fm + fd)$$

$$fc = fm + / - 2*fd$$

and $$fe = -fm$$

where:

$$fm = f1 - f2.$$

Figure 8:
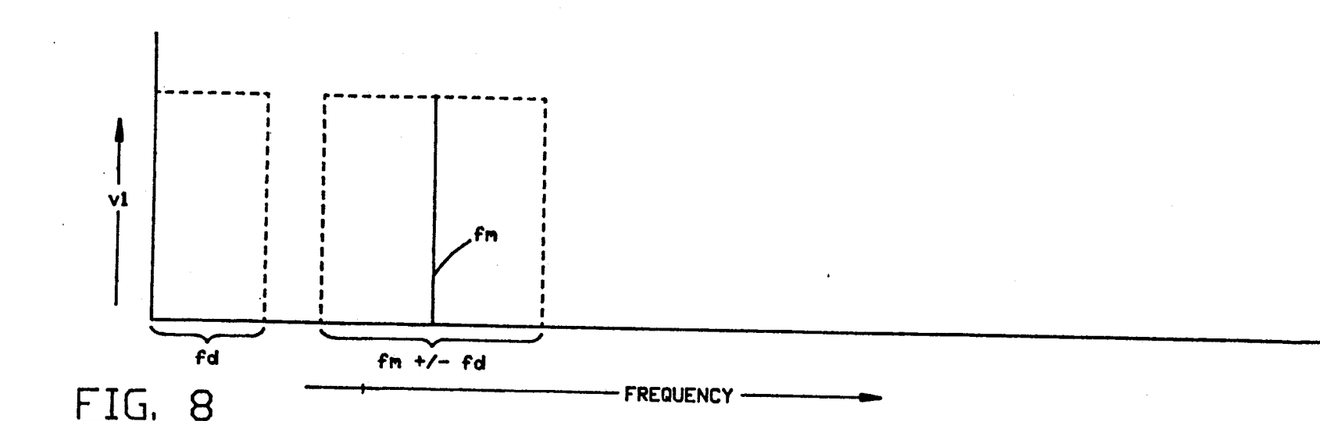
FIG. 8 is a graph illustrating the spectral content of the RANGE CARRIER v1 signal from DETECTOR 1.
Figure 9:
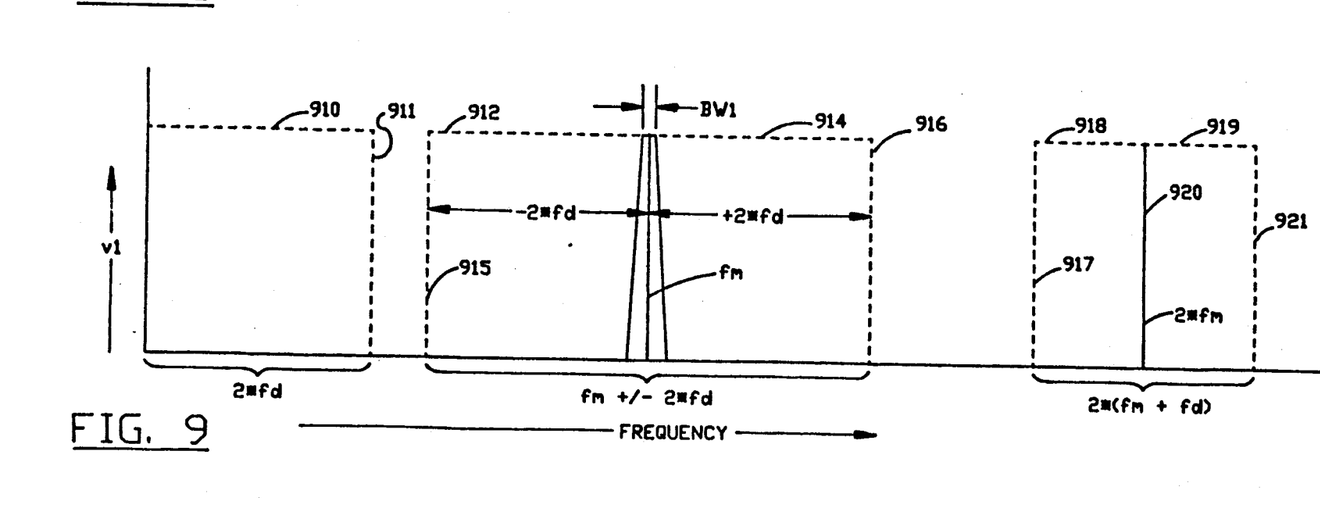
FIG. 9 is a graph illustrating the spectral content of the SQUARED RANGE CARRIER v2 signal from the MIXER.

FIG. 8 graphically depicts the relative location of the spectral components of v1 and FIG. 9 does the same for v2. The component fa is shown in FIG. 9 to vary from zero to an upper limit that relates to the relative velocity between the laser radar and the target. The second band has a spectral range centered at frequency and extending above and below by frequency fd.

Referring to FIG. 8, with no relative motion between the target and the receiver present, signal energy is available at frequency fm. With relative motion, the signal energy is found in two frequencies that move outward from frequency fm in positive and negative directions to limits determined by the maximum value of doppler shift present, i.e. fd. A component of signal energy remains at frequency fm.

Referring to FIG. 9, band 910 represents the spectral location of a doppler signal component 2*fa. This component of received signal information can reside anywhere in the allocated band up to the maximum frequency limit of 2*fd, 911 depending on the relative system to target velocity. The second band at the center region of FIG. 9, i.e. 912,914 represents a spectral range that contains spectral signal element that contains a fixed frequency component fm in addition to two side lobes that move in a range limited by +/−2*fd.

A signal band 918, 919 centered on 2*fm is also present. This band is easily filtered since it is an octave higher than fm and its side lobes are tailored to be far above fm. Band pass filter 120 is a passive filter designed to selectively extract only information at fm within the band designated BW1 for amplification and processing as the FILTERED RANGE SIGNAL v3 by synchronous phase demodulator 160.

Intensity modulation for processing purposes results from the interaction of the light waves to yield constructive and destructive interference. Analytical expressions can be written to describe the system operation as follows: Let the transmittal light from scanner 150 be represented by:

$$E_T(t) = E_{1T} \cos P_{1T}(t) + E_{2T} \cos P_{2T}(t) \tag{1}$$

where the subscript T denotes transmission and P(t) is the phase function defining the output of the laser. Upon reflection from a target described by the coefficient, ro, the return signal to the input part of the receiver is $$E_R(t+u) = ro\, E_{1T} \cos P_{1R}(t+u) + ro\, E_{2T} \cos P_{2R}(t+u) \tag{2}$$

where the subscript ro denotes the received signal and u is the round trip transit time, 2R/C. "C" is the speed of light. It should be noted that the character of the phase function, $P_R(t+u)$, may or may not be the same as $P_T(t)$, dependent upon the relative velocity present between transmitter and receiver.

In the most general terms, heterodyne operation at the detector can be defined by:

$$E_s(t) = E_{LO} \cos P_{LO}(t) + E_R(t+u) \tag{3}$$

Substituting the expression for $E_R(t+u)$ from (2) into (3) results in (3a)

$$E_s(t) = E_{LO}(t) \cos P_{LO}(t) + ro[E_{1T} \cos P_{1R}(t+u) + E_{2T} \cos P_{2R}(t+u)] \tag{3a}$$

The optical detector, the first detector 60, performs a square law function yields $$I_s(t) = \tag{4}$$

$E_s(t)\, E_s(t)^*$, where $E_s(t)^*$ is the complete conjugate of $E_s(t) =$

-continued $E_{LO}^2 \cos^2 P_{LO}(t) + ro^2[E_{1T}^2 \cos^2 P_{1R}(t+u) + E_{2T}^2 \cos^2 P_{2R}(t+u) +$ $2E_{1T}E_{2T}\cos P_{1R}(t+u)\cos P_{2R}(t+u)] +$ $ro\,[2E_{LO}E_{1T}\cos P_{LO}(t)\cos P_{1R}(t+u) +$ $2E_{LO}E_{2T}\cos P_{LO}(t)\cos P_{2R}(t+u)]$.

Equation (4) is the result of taking the product of Es(t) and its conjugate. Detector 60 achieves this function. The resulting signal is observed to have four terms, each being a discrete intensity component with some of the terms being AC and some DC in character by observing that $$\cos^2 x = \tfrac{1}{2}(1 - \cos 2x) = D.C. + A.C.$$

where the A.C. term is at twice the light frequency and beyond the detector response. Assuming all D.C. terms are blocked, Equation (4) reduces to:

$$I_s(t) \approx ro^2\,[2E_{1T}E_{2T}\cos P_{1R}(t+u)\cos P_{2R}(t+u)] + \tag{5}$$

$ro[2E_{LO}E_{1T}\cos P_{LO}(t)\cos P_{1R}(t+u) +$ $2E_{LO}E_{2T}\cos P_{LO}(t)\cos P_{2R}(t+u)]$ Since the product of the cosines of two different angles is controlled by the trigonometric identity:

$$\cos x \cos y = \tfrac{1}{2}[\cos(x+y) + \cos(x-y)]$$

and since the sum of the angles (x+y) represents angles changing with time as two optical frequencies beyond the pass band, of practical detection, Equation (5) further reduces to $$I_s(t) \approx ro^2 E_{1T}E_{2T}\cos[P_{1R}(t+u) - P_{2R}(t+u)] + \tag{6}$$

$ro[E_{LO}E_{1T}\cos[P_{LO}(t) - P_{1R}(t+u)] +$ $E_{LO}E_{2T}\cos[P_{LO}(t) - P_{2R}(t+u)]]$ Equation (6) represents the basic return information of the system of FIG. 1 such as the signal v1 from BS3 to DET1, 60.

The first term in Equation 6 is a "direct" detection quantity (local oscillator power for heterodyne gain is not involved) and for the signal levels expected can be ignored. (Close, highly reflective targets could probably be observed.) Thus, for the case in which $E_{1T} = E_{2T}$, (100% modulation).

$$I_s(t) \approx ro\, E_{LO}E_{1T}[\cos[P_{LO}(t) - P_{1R}(t+u)]] + \cos(P_{LO}(t) - P_{2R}(t+u))]] \tag{7}$$

Evaluation of Equation (7) depends upon the relationships among the signal angles $P_{LO}$, $P_{1R}$, and $P_{2R}$ which are continuously changing as functions of time (t). The signal information is processed in the present invention as signals in the frequency domain. Since frequency is the time, rate of change of phase $P_{LO}$, we take the derivative of $P_{LO}(t)$ to obtain $f_{LO}$.

$$d/dt(P_{LO}(t)) = f_{LO} \tag{8}$$

The same step is taken for $P_{1R}(t)$ and $P_{2R}(t)$ to obtain $$d/dt(P_{1R}(t)) = f1 - fd$$

and $$d/dt(P_{2R}(t)) = f_2 - f_d \quad (8a)$$

where the Doppler shift is fd and a receding target is assumed. Let f2=f1−df where df is the offset controlled frequency between laser 1 and laser 2.

Equation (7) can now be written as $$I_s(t) \approx ro\, E_{LO}E_{1T}[\cos[f_{LO}t - (f_1 - f_d)(t+u)] + \cos[f_{LO}t - (f_2 - f_d)(t+u)]]$$

$$I_s(t) \approx ro\, E_{LO}E_{1T}[\cos[(f_{LO}-f_1+f_d)(t+u) - u f_{LO}] + \cos[(f_{LO}-f_2+f_d)(t+u) + u f_{LO}]]$$

$$I_s(t) \approx ro\, E_{LO}E_{1T}[\cos[(f_{LO}-f_1+f_d)(t+u) - u f_{LO}] + \cos[(f_{LO}-f_2+df+f_d)(t+u) - u f_{LO}]] \quad (9)$$

Equation (9) represents two carrier frequencies separated by the offset frequency df.

The i-f and bandwidth requirements are determined by the difference frequency defined by $f_{LO} - f_1$, and the range of doppler frequencies, fd, which are present.

To further process the information, consider that Equation (9) can be written in the form of:

$$I_s(t) = ro\, E_{LO}\, E_{IT}[\cos A(t) + \cos B(t)]$$

where:

$$A(t) = (f_{LO} - f_1 + f_d)(t+u) - u f_{LO}$$

$$B(t) = (f_{LO} - f_1 + df + f_d)(t+u) - u f_{LO} \quad (10)$$

Isolating and amplifying the signal (10) with subsequent r-f detection by inserting the second mixer such as the MIXER 110 in FIG. 1 to square v1 yields:

$$S(t) \approx ro^2 E_{LO}^2 E_{1T}^2[\cos^2 A(t) + \cos^2 B(t) + 2\cos A(t)\cos B(t)] \quad (11)$$

$$S(t) \approx ro^2 E_{LO}E_{1T}^2[\tfrac{1}{2}(1+\cos 2A(t)) + \tfrac{1}{2}(1+\cos 2B(t)) + \cos(A(t)+B(t)) + \cos(A(t)-B(t))].$$

Equation (11) shows that four new frequencies are generated and that their relationship in the processing spectrum must be considered.

$$f_a = d/dt\, 2A(t) = 2(f_{LO}-f_1+f_d)$$

$$f_b = d/dt\, 2B(t) = 2(f_{LO}-f_1+df+f_d)$$

$$f_c = d/dt\,[A(t)+B(t)] = 2(f_{LO}-f_1+f_d)+df$$

$$f_e = d/dt\,[A(t)-B(t)] = -df \quad (12)$$

The set of information defined by (10) and (12) is available for determining imaging and range information.

The invention radar system is mechanized without a separate local oscillator laser. The invention system is suggested by letting the local oscillator frequency I(t): $f_{LO} = f_1$.

By setting $f_{LO} = f_1$, the spectral content for (10) and (12) are then $$d/dt\, A(t) = f_d$$

$$d/dt\, B(t) = (df + f_d) \quad (13)$$

and the spectral frequencies within S(t) by operation of the second MIXER 110 are then shown to be:

$$f_a = 2 f_d$$

$$f_b = 2(df + f_d)$$

$$f_c = df + 2 f_d$$

$$f_e = -df \quad (14)$$

These equations show that the necessary information for 3-D imaging and ranging are available at all time—with or without relative motion for Doppler shift. No Doppler tracking circuitry is required. Further, very reasonable requirements are placed upon the circuitry for frequency locking to the df offset. However, for the moving platform, S(t), requires the speed to be chosen so as not to inject signal in the processor bandwidth associated with df.

With the noted restrictions on df, as discussed above in connection with FIGS. 8 and 9, unambiguous operation can always be assured. However, df is a variable of this system, and operation need not be restricted since a narrow band processor tuned to df can effectively isolate the processor from Doppler effects for all conditions except df=2 fd or 4 fd.

Range information is always available from df $$\left(t + \frac{2R}{C}\right)$$

through use of a synchronous demodulator 160. However, $$\frac{2\, df\, R}{C} < 2\pi$$

requires that:

$$df < \frac{C}{2R}$$

as expected if no ambiguities are required.

BAND-PASS FILTER DESIGN CONSIDERATIONS:

BAND-PASS FILTER 120 is typically a band-pass filter synthesized to establish the noise limits of the system. The band-width of this filter is set by the dwell time of the transmits SINGLE FREQUENCY LIGHT SOURCE on the illuminated target. In a typical system in which the beam spends 10 us on each pixel, the band-pass of filter 120 is designed to roll off all frequencies above 100 kHz. This design limit is not related to doppler shift or the the fm frequency.

What is claimed is:

1. A mobile laser radar for scanning a target aperture having a predetermined array of locations comprising:

a laser means having a power source and a resonator cavity containing a lasing medium, said laser means providing a SINGLE FREQUENCY LIGHT SOURCE (FO);

means for dividing said SINGLE FREQUENCY LIGHT SOURCE into FIRST and SECOND REFERENCE FREQUENCY BEAMS;

frequency shifting means for frequency shifting said FIRST REFERENCE FREQUENCY BEAM to form a FREQUENCY SHIFTED BEAM;

control means for providing APERTURE DIRECTION SIGNALS;

scanner means responsive to said APERTURE DIRECTION SIGNALS for combining and directing said SECOND REFERENCE FREQUENCY BEAM and said FREQUENCY SHIFTED BEAM to each predetermined target aperture location and for receiving a combined REFLECTED REFERENCE FREQUENCY BEAM SIGNAL and a REFLECTED FREQUENCY SHIFTED BEAM SIGNAL from said target;

detector means for combining and detecting a sample of said SECOND REFERENCE FREQUENCY BEAMS in combination with said REFLECTED REFERENCE FREQUENCY BEAM SIGNAL and said REFLECTED FREQUENCY SHIFTED BEAM SIGNAL to provide a RANGE CARRIER SIGNAL;

monitor means for combining and detecting a sample of said SINGLE FREQUENCY LIGHT SOURCE, and a sample of said FREQUENCY SHIFTED BEAM to form a DEMODULATION REFERENCE SIGNAL;

phase demodulation means referenced to said DEMODULATION REFERENCE SIGNAL and responsive to said RANGE CARRIER SIGNAL for demodulating said RANGE CARRIER SIGNAL to provide a RELATIVE RANGE SIGNAL; and signal processor and display means responsive to said RELATIVE RANGE SIGNAL and to the APERTURE DIRECTION SIGNALS for quantizing and storing the digital the digital value of the amplitude of the corresponding relative phase delay between the RELATIVE RANGE SIGNAL and said DEMODULATION REFERENCE SIGNAL for each respective location in said target aperture.

2. The laser radar of claim 1 wherein said means for dividing said SINGLE FREQUENCY LIGHT SOURCE into FIRST and SECOND REFERENCE FREQUENCY BEAMS further comprises:

a first beamsplitter having at least a first input port and reflected and transmitting output ports; said input port being positioned to be responsive to said SINGLE FREQUENCY LIGHT SOURCE, said reflect output port being characterized to provide said FIRST REFERENCE FREQUENCY BEAM and said output port being characterized to provide a SECOND REFERENCE FREQUENCY BEAM.

3. The laser radar of claim 1 wherein said control means further comprises:

a digital controller for providing a recurring sequence of DIGITIZED APERTURE DIRECTION SIGNALS; and a signal conditioner and drive amplifier for conditioning and scaling said DIGITIZED APERTURE DIRECTION SIGNALS to provide scanner drive motor signals characterized to drive the scanner to reflect the REFERENCE FREQUENCY BEAM and said FREQUENCY SHIFTED BEAM to each target aperture location to be illuminated by said REFERENCE FREQUENCY BEAM and said FREQUENCY SHIFTED BEAM.

4. The laser radar of claim 1 wherein said scanner means further comprises:

a scanner reflector means responsive to said REFERENCE FREQUENCY BEAM and said FREQUENCY SHIFTED BEAM and for reflecting said beams to a target and for continuously receiving a REFLECTED REFERENCE FREQUENCY BEAM SIGNAL and a REFLECTED FREQUENCY SHIFTED BEAM SIGNAL from said target: and gimbal and drive motor assembly responsive to said drive motor signals for driving said reflector means laterally and vertically to sequentially point said REFERENCE FREQUENCY BEAM and said FREQUENCY SHIFTED BEAM at each successive target aperture location in response to said SCANNER DRIVE MOTOR SIGNALS and to receive said REFLECTED REFERENCE FREQUENCY BEAM SIGNAL and a REFLECTED FREQUENCY SHIFTED BEAM SIGNAL from each said target aperture location.

5. The laser radar of claim 1 wherein said detector means further comprises:

a beamsplitter responsive to a sample of said SECOND REFERENCE FREQUENCY BEAM, said REFLECTED REFERENCE FREQUENCY BEAM and said REFLECTED FREQUENCY SHIFTED BEAM for combining said beams to provide a RECEIVED SIGNAL BEAM; and diode detector and amplifier means responsive to said RECEIVED SIGNAL BEAM for mixing said beam signal to provide a RANGE CARRIER SIGNAL.

6. The laser radar of claim 1 wherein said detecting means further comprises:

a bias and amplifier means for biasing said detector diode, and for amplifying the low level RANGE CARRIER SIGNAL, the gain and bandwidth of said amplifier being characterized to provide said RANGE CARRIER SIGNAL having an amplitude in a predetermined range.

7. The laser radar of claim 1 wherein said phase demodulator means further comprises:

mixer means responsive to said RANGE CARRIER SIGNAL for squaring said RANGE CARRIER SIGNAL to provide a SQUARED RANGE CARRIER SIGNAL;

filter means responsive to said SQUARED range carrier SIGNAL for filtering said SQUARED RANGE CARRIER SIGNAL within a predetermined band-pass to provide a FILTERED RANGE SIGNAL; and a synchronous phase demodulator responsive to said FILTERED RANGE SIGNAL and to said DEMODULATOR REFERENCE SIGNAL for providing said RELATIVE RANGE SIGNAL.

8. The laser radar of claim 7 wherein said mixer means further comprises:

a multiplier having a first and second input and an output, said first and second inputs being responsive to said RANGE CARRIER SIGNAL, said output providing said SQUARED RANGE CARRIER SIGNAL.

9. The laser radar of claim 1 wherein said signal processor and display means further comprises:
  a display means for displaying an image of the scene scanned by said scanner as an array of illuminated pixels (picture elements), the intensity of each pixel being controlled by the stored amplitude value of said RELATIVE RANGE SIGNAL, the color of each pixel being controlled by the stored value of the relative phase delay between the RELATIVE RANGE SIGNAL and said DEMODULATION REFERENCE SIGNAL.

10. The laser radar of claim 1 wherein said signal processor and display means further comprises:
  a display means for displaying a perspective image of the scene scanned by said scanner as an array of illuminated pixels (picture elements), the location and intensity of each pixel being controlled by the respective APERTURE DIRECTION SIGNAL and the corresponding stored amplitude value of said RELATIVE RANGE SIGNAL and the color of each pixel being controlled by the stored value of the corresponding relative phase delay between the RELATIVE RANGE SIGNAL and said DEMODULATION REFERENCE SIGNAL.

11. A laser radar for scanning a target aperture having a predetermined array of locations comprising:
  a laser means having a power source and a resonator cavity containing a lasing medium, said laser means providing a SINGLE FREQUENCY LIGHT SOURCE (FO);
  means for dividing said SINGLE FREQUENCY LIGHT SOURCE into FIRST and SECOND REFERENCE FREQUENCY BEAMS;
  frequency shifting means responsive to said SINGLE FREQUENCY LIGHT SOURCE for shifting the frequency of a sample of said SINGLE FREQUENCY LIGHT SOURCE to form a FREQUENCY SHIFTED BEAM:
  control means for providing APERTURE DIRECTION SIGNALS;
  scanner means responsive to said APERTURE DIRECTION SIGNALS for combining and directing said SECOND REFERENCE FREQUENCY BEAM and said FREQUENCY SHIFTED BEAM to each predetermined target aperture location and for receiving a combined REFLECTED REFERENCE FREQUENCY BEAM SIGNAL and REFLECTED FREQUENCY SHIFTED BEAM SIGNAL from said target;
  detector means for combining and detecting a sample of said SINGLE FREQUENCY LIGHT SOURCE in combination with said REFLECTED REFERENCE FREQUENCY BEAM SIGNAL and said REFLECTED FREQUENCY SHIFTED BEAM SIGNAL to provide a RANGE CARRIER SIGNAL;
  monitor means for combining and detecting a sample of a SINGLE FREQUENCY LIGHT SOURCE, and a sample of said FREQUENCY SHIFTED BEAM, to form a DEMODULATION REFERENCE SIGNAL;
  phase demodulator means referenced to said DEMODULATION REFERENCE SIGNAL and responsive to said RANGE CARRIER SIGNAL for squaring said RANGE CARRIER SIGNAL to form a SQUARED RANGE CARRIER SIGNAL and for band pass filtering and demodulating said SQUARED RANGE CARRIER SIGNAL to provide a RELATIVE RANGE SIGNAL; and
  signal processor and display means responsive to said DEMODULATION REFERENCE SIGNAL, said RELATIVE RANGE SIGNAL and to the APERTURE DIRECTION SIGNALS for quantizing and storing the digital value of the amplitude of the corresponding RELATIVE RANGE SIGNAL and for quantizing and storing the value of the corresponding relative phase delay between the RELATIVE RANGE SIGNAL and said DEMODULATION REFERENCE SIGNAL for each respective location in said target aperture.

* * * * *